United States Patent

[11] 3,536,230

| | | |
|---|---|---|
| [72] | Inventor | John E. Williams<br>Oshkosh, Wisconsin |
| [21] | Appl. No. | 762,886 |
| [22] | Filed | Sept. 26, 1968 |
| [45] | Patented | Oct. 27, 1970 |
| [73] | Assignee | By mesne assignments, to<br>Rockwell-Standard Company<br>Pittsburgh, Pennsylvania<br>a corporation of Delaware |

[54] REDUCTION GEARING DRIVE CONTROL
12 Claims, 7 Drawing Figs.

[52] U.S. Cl............................................. 192/3,
74/411.5, 188/170
[51] Int. Cl................................................F16d 23/00,
F16d 65/24, F16d 57/10
[50] Field of Search............................................ 74/411.5;
192/3; 188/170

[56] References Cited
UNITED STATES PATENTS

| 2,927,669 | 3/1960 | Walerowski.................. | 192/3 |
| 3,125,200 | 3/1964 | Kaman......................... | 192/3 |
| 3,132,724 | 5/1964 | Ansteth....................... | 188/170 |
| 3,244,405 | 4/1966 | Hanning....................... | 188/170X |
| 3,249,336 | 5/1966 | Brown et al.................. | 192/3X |
| 3,253,683 | 5/1966 | Stein........................... | 192/3 |
| 3,456,767 | 7/1969 | Hollnagel et al.............. | 188/170 |

*Primary Examiner*—Leonard H. Gerin
*Attorney*—Strauch, Nolan, Neale, Nies and Kurz

ABSTRACT: Reduction gearing for driving a device such as a winch is mounted in a main housing, and a disc brake for the input of the gearing is contained in an auxiliary housing mounted between a hydraulic drive motor and the main housing. The brake is hydraulically disengaged and spring engaged. The brake can be connected to the motor hydraulic circuit so as to be disengaged when the motor is operated to drive the gearing, and compressed springs within the auxiliary housing positively engage the brake at the reduction gear input when the hydraulic brake disengaging pressure is removed.

INVENTOR
JOHN E. WILLIAMS
BY Shauck, Nolan, Neale,
Niss & Kurz ATTORNEYS

Patented Oct. 27, 1970
3,536,230
Sheet 3 of 4
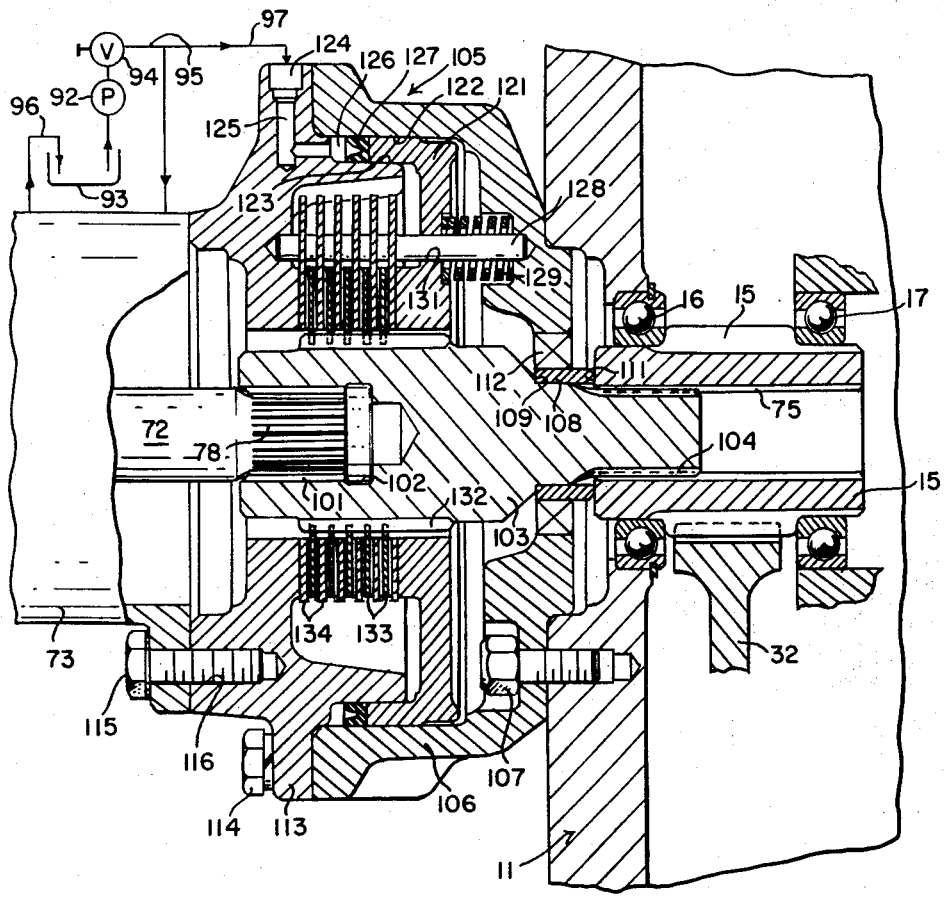
FIG. 3
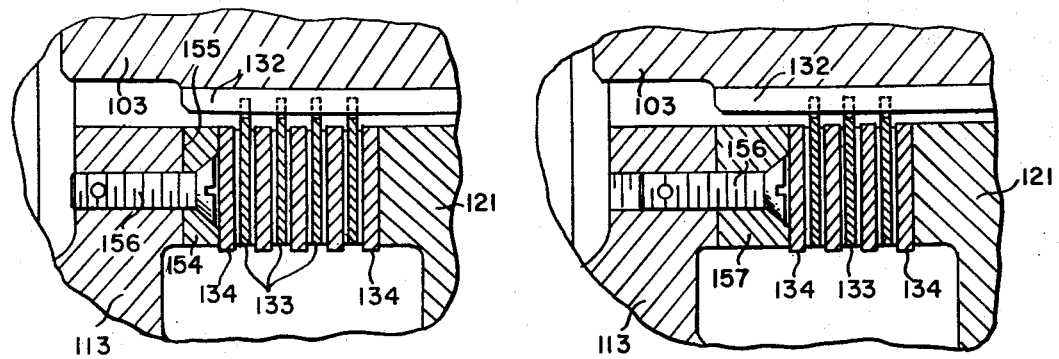
FIG. 6
FIG. 7
INVENTOR
JOHN E. WILLIAMS
BY Strauch, Nolan, Neale,
Nies & Kurz
ATTORNEYS Patented Oct. 27, 1970

INVENTOR
JOHN E. WILLIAMS

BY Strauch, Nolan, Neale,
Nies & Kurz
ATTORNEYS 3,536,230

REDUCTION GEARING DRIVE CONTROL

BACKGROUND AND SUMMARY OF INVENTION

The invention relates to reduction gearing drive control and the novel assembly of a brake with a speed reduction gear unit for rapidly arresting the transmission of power to the unit and the device driven by the unit. For example, these devices may be cranes, turntables, hoists, winches, back hoes, agricultural implements and crawler tracks and other manipulated devices where immediate and positive response to operator controls is desired. The invention contemplates an operator controlled brake at the input of the reduction gearing that is held disengaged by hydraulic means and is spring engaged.

While hydraulically engaged and disengaged brakes are in general old, and in fact it has been proposed to provide spring applied and hydraulically disengaged brakes in certain environments, such as generally disclosed in Bozzola U.S. Pat. No. 3,179,210, the present invention contemplates a more positively acting novel assembly of parts wherein a hydraulically disengaged and spring applied brake assembly is provided for direct action at the input of speed reduction gearing, and such is the major object of the invention.

Further objects of the invention comprise various novel mechanical combinations wherein an auxiliary housing mounts a disc brake unit at the motor driven input of a speed reduction gear box, with provision for automatic hydraulic operation of the brake unit to disengaged condition when the motor is driving the reduction gearing, and automatic spring powered application of the brake when the motor drive is inactivated. The brake unit contains a reciprocable brake disc operating plunger exposed at one side to a hydraulic pressure chamber, which pressure could be derived from the motor circuit where the motor is a hydraulic motor, and engaged at the other side by a series of compressed springs.

BRIEF DESCRIPTION OF DRAWINGS

FIG. 3 is a fragmentary sectional view showing the input brake mechanism of the invention as incorporated in a further embodiment;

FIGS. 6 and 7 are fragmentary sectional views showing the use of spacers in the auxiliary housing when fewer brake discs are used.

PREFERRED EMBODIMENT OF INVENTION

Figure 1:
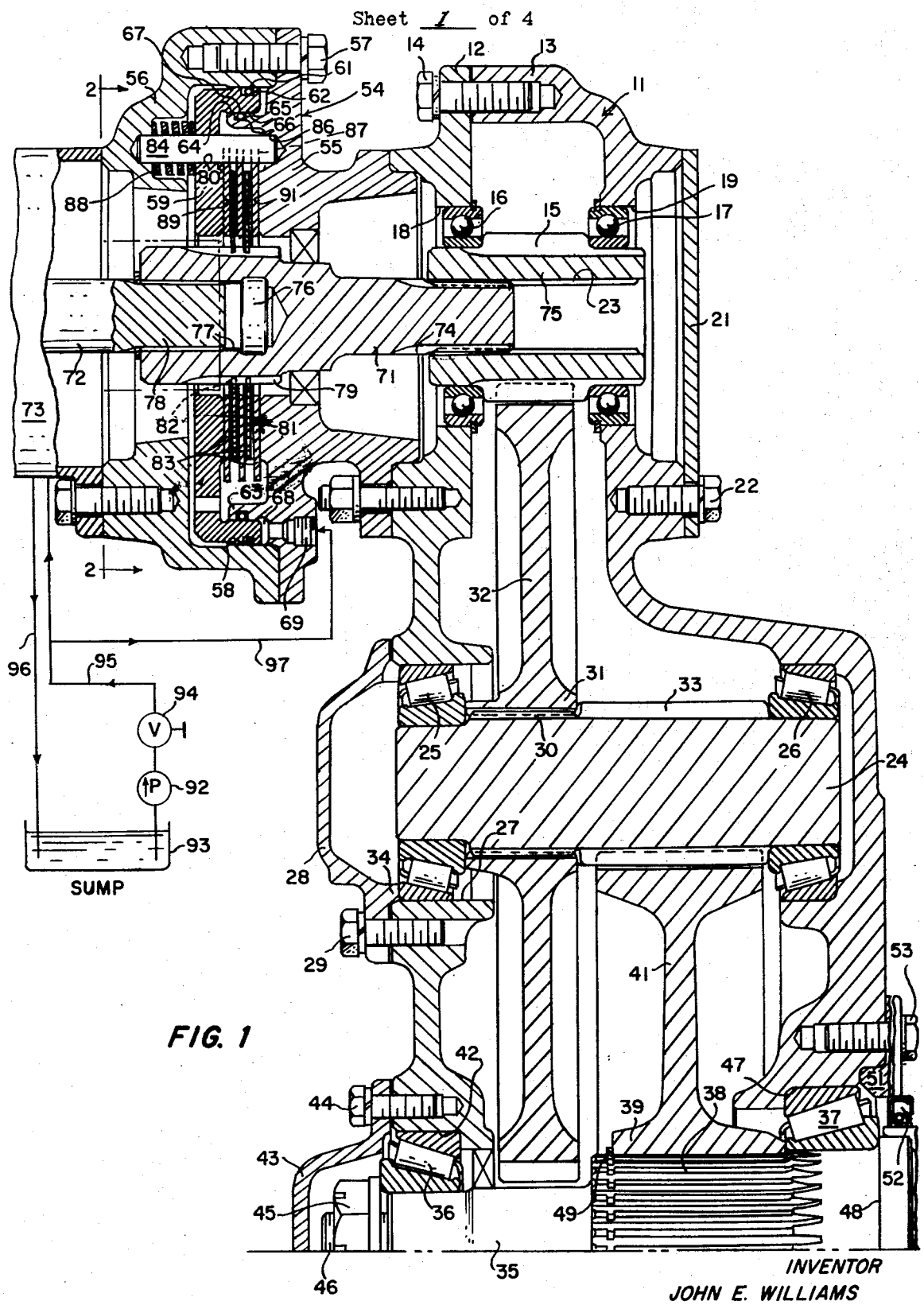
FIG. 1 is a section taken substantially vertically through a speed reduction and associated brake assembly according to a preferred embodiment of the invention.

FIG. 1 shows speed reduction gearing enclosed in a main housing 11 comprising side members 12 and 13 secured together as by a peripheral row of bolts 14. An input spur gear 15 is rotatably mounted at opposite ends in ball bearing assemblies 16 and 17 disposed in opposed openings 18 and 19 respectively of housing side members 12 and 13. Rear opening 19 is normally closed, as by a plate 21 secured to housing member 13 by a row of screws 22. Interiorly gear 15 is formed with a set of longitudinal splines 23.

A countershaft 24 is rotatably mounted in tapered roller bearing assemblies 25 and 26 on housing side members 12 and 13. The outer race of bearing 26 axially abuts housing member 13. Bearing 25 is disposed in a housing opening 27 normally closed by a cover 28 secured to housing member 12 by a row of bolts 29.

Shaft 24 is splined at 30 for slidably receiving the internally splined hub 31 of a spur gear 32 meshed with gear 15. Shaft 24 is formed with an integral spur gear 33 between the splined section 30 and bearing 26. The opposite ends of gear 33 axially abut the inner race of bearing 26 and one end of hub 31. The other end of hub 31 axially abuts the inner race of bearing 25. An internal projection 34 on cover 28 axially abuts the outer end of the outer races of bearing 25. Thus when bolts 29 are drawn tight the bearings are loaded and gear 32 is axially retained on shaft 24.

An output shaft 35 is rotatably mounted in tapered roller bearings 36 and 37 in housing members 12 and 13 respectively, and shaft 35 is longitudinally splined at 38 to mount the internally splined hub 39 of a spur gear 41 meshed with gear 33. Bearing 36 is disposed in opening 42 of housing member 12 which is normally closed by a cap 43 secured in place by bolts 44. The outer race of bearing 36 axially abuts housing member 12 at the inner edge of opening 42, and a suitable nut and washer assembly 45 on the threaded end 46 of shaft 35 provides for bearing retainer and adjustment. The outer race of bearing 37 axially abuts the inner edge of an opening 47 wherein the bearing is disposed, and its inner race axially abuts a shoulder 48 on shaft 35. Thus when fastener assembly 45 is drawn tight the bearings 36 and 37 are retained and loaded. Gear hub 39 is axially retained between the inner race of bearing 37 and a snap ring 49 in a groove on the shaft.

An annular seal retainer 51 carrying an oil seal 52 surrounding shaft 35 is secured to housing member 13 by bolts 53. Shaft 35 extends rearwardly beyond housing 11 to be connected to a mechanism (not shown) to be driven at the reduced speed.

The lower half of shaft 35 is the same as the upper half shown in FIG. 1. The housing side members are secured together below the shaft 35 in the same manner as at the upper part of the housing to complete enclosure of the reduction gearing and retain lubricant for the gears.

Referring to FIG. 1 an auxiliary housing 54 is suitably rigidly secured to main housing 11 at opening 18. Auxiliary housing 54 comprises an inner portion 55 bolted to housing member 12 and an outer portion 56 rigidly secured to the inner portion as by a row of bolts 57.

Outer housing portion 56 is formed with an internal cylindrical surface 58 which slidably mounts the annular plunger 59 of a disc brake assembly. Plunger 59 has a surface groove 61 containing a resilient seal ring 61 to provide a fluid tight sliding seat fit with surface 58. Inner housing portion 55 has an annular rib 63 projecting into the auxiliary housing interior, rib 63 being peripherally cylindrical at 64 to slidably engage an inner cylindrical surface 65 on plunger 59. Rib 63 has a surface groove 66 containing a resilient seal ring 67 to provide a fluid tight sliding seal fit with surface 65.

Thus plunger 59 is mounted for reciprocation on coaxial guide surfaces 58 and 64 on the auxiliary housing portions. For a purpose to appear, there is an annular chamber 68 in the auxiliary housing adapted to be connected to a housing port 69 to receive fluid under pressure.

A coupling shaft 71 interconnects the output shaft 72 of a hydraulic motor 73 with the input gear 15 of the reduction gearing. As shown, shaft 71 is splined at its inner end at 74 to enter the splined hub 75 of gear 15 and is recessed at its outer end at 76 to provide a splined bore 77 receiving the splined end 78 of motor shaft 72. Shafts 72 and 71 and gear 15 are coaxial.

Shaft 71 has a longitudinally splined section 79 for nonrotatably but axially slidably mounting a plurality of annular flat-sided brake discs 81. Each disc 81 has a serrated inner periphery 82 for sliding longitudinally onto and on the splined shaft section 79. A plurality of coacting annular flat-sided brake discs 83 are supported on a plurality of stationary pins 84, shown as six in number, that extend longitudinally between recesses 85 and 86 in the respective housing portions. Pins 84 pass slidably through plunger apertures 80. Where there are two discs 81 as shown there are three discs 83 and their outer peripheries are arcuately notched or apertured at 87 to longitudinally slidably support the discs 83 on pins. Each pin 84 is surrounded by a coiled spring 88 that acts to urge plunger 59 to the right in FIG. 1 to displace the brake discs 81 and 83 into friction surface contact and tend to lock shaft 71 to the housing. The inner peripheries of discs 83 have ample clearance with shaft 71, and the outer peripheries of discs 81 have ample clearance with the pins 84.

Three outer discs 83 are shown in this embodiment, and the flat sides of the two axially outer discs engage flat faces 89 and 91 on the brake plunger and the housing respectively. Discs 81 extend into the spaces between the three outer discs 83. Discs 81 and 83 may have friction material or formations on their engaging surfaces. When the assembly is in operation, that is when motor 73 is being driven to rotate shaft 71 and the reduction gearing, the hydraulic circuit shown diagrammatically in FIG. 1 is operated by a pump 92 to deliver oil under pressure from a sump 93 to motor 73. Valve 94 determines whether the oil under pressure is supplied to motor line 95. The return line 96 goes back to the sump. A branch conduit 97 connects line 95 to housing port 69 and chamber 68, so that whenever the motor 73 is being driven with the usual oil pressure in line 95, plunger 59 will be automatically displaced to the left in FIG. 1 and held in brake released position, so that shaft 71 is free to rotate. Springs 88 are compressed and energized by the brake disengaging action. When valve 94 is closed to inactivate the motor, oil pressure reduces in chamber 68, oil returning to the sump as by a suitable relief path (not shown) in or around valve 94, and springs 88 quickly expand to displace plunger 59 to the right and positively engage the brake discs to arrest rotation of shaft 71.

Referring to FIG. 3, a further embodiment is illustrated wherein motor shaft 72 has its splined section 78 nonrotatably engaged with the splined portion 101 of a central end bore 102 of a coupling shaft 103 that has its reduced inner end longitudinally splined at 104 for nonrotatable connection with the internal splines 23 of gear 15.

In this embodiment the auxiliary housing 105 comprises an inner housing portion 106 rigidly secured as by bolts 107 to the main housing 11. An axially rigid spacer collar 108 extends between a shoulder 109 on shaft 103 and the adjacent end face 111 of gear 15, and a suitable lubricant seal device 112 extends between the housing portion 106 and collar 108.

Figure 2:
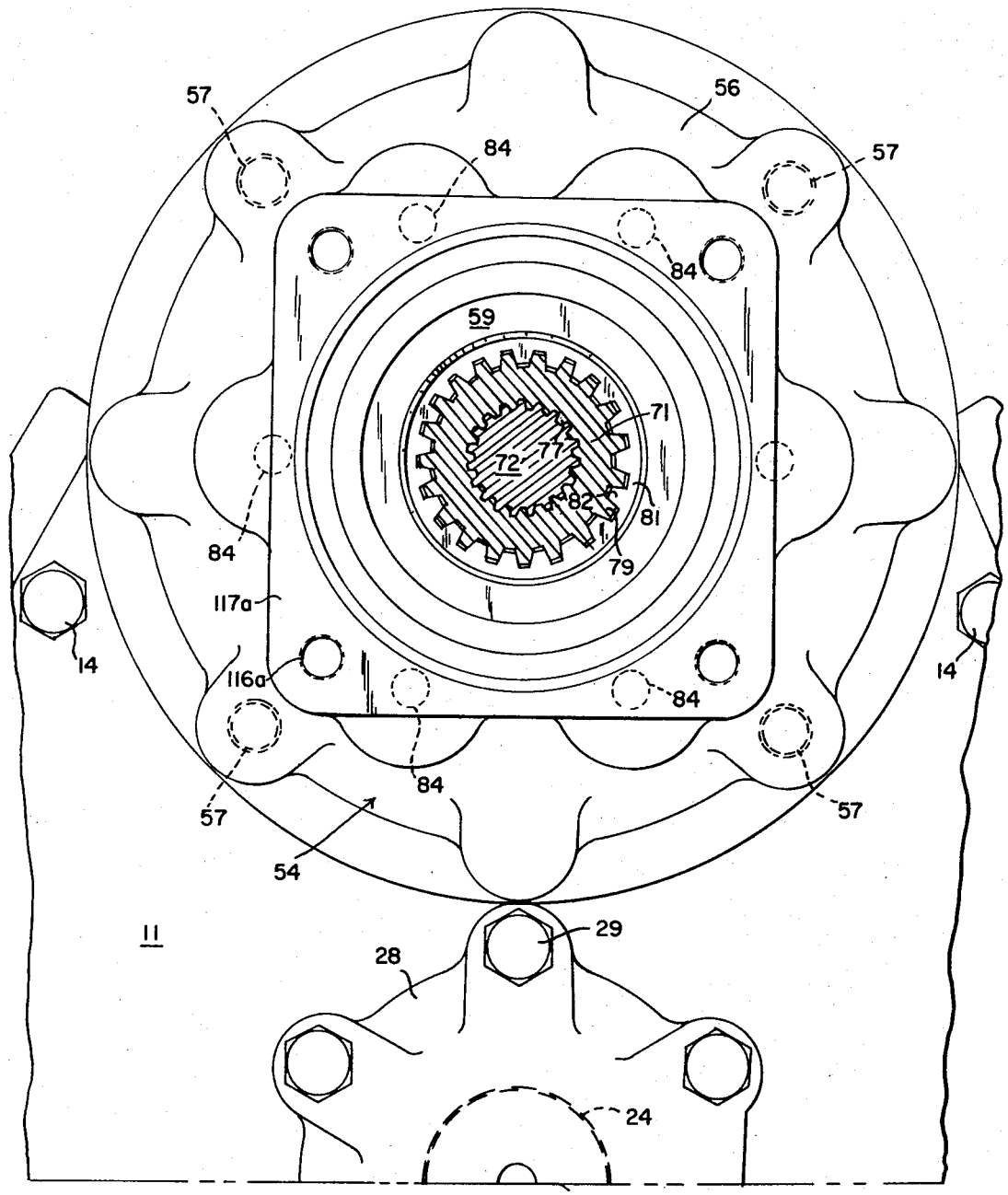
FIG. 2 is a fragmentary enlarged end view of the assembly looking from left to right in FIG. 1 with the hydraulic motor removed and sectioned on line 2–2 of FIG. 1.

Outer auxiliary housing portion 113 is secured to the inner portion by a plurality of bolts 114. Motor 73 is secured to the outer housing portion by a series of bolts 115 extending into threaded holes 116 in the outer generally rectangular flange 117 of housing portion 113. Referring back to FIG. 2 it will be seen that there is a similar motor mounting flange 117a having threaded holes 116a.

An annular plunger 121 is slidably mounted between cylindrical surfaces 122 and 123 of the auxiliary housing portions for reciprocation parallel to the axis of shaft 103. A port 124 in housing portion 113 connected to oil pressure line 95 is connected by passage 125 to an annular chamber 126 opposite the resilient seal ring 127 at one end of plunger 121.

A plurality of fixed parallel pins 128 have their opposite ends fixed in the auxiliary housing portions, and each is surrounded by a coiled compression spring 129 extending between the auxiliary housing and piston 121 to bias piston 121 to the left in FIG. 3. Plunger 121 is apertured at 131 for slidable clearance with pins 128.

Shaft 103 is longitudinally splined at 132 to nonrotatably mount the inner serrated peripheries of a series of parallel inner brake discs 133 similar to discs 81, and a series of parallel outer brake discs 134 similar to discs 83 are longitudinally slidably supported on pins 128. Discs 133 extend through the spaces between discs 134. When fluid pressure is introduced into chamber 126, as when motor 73 is being driven, plunger 121 is displaced to the right in FIG. 3 so that the brake discs are not frictionally engaged and shaft 103 is free to rotate. Springs 129 are compressed in this position of the plunger.

When hydraulic pressure is reduced in chamber 126, the energized springs 129 expand to displace plunger 121 to the left and urge the brake discs into frictional engagement for arresting rotation of shaft 103 and the associated reduction gearing.

Figure 4:
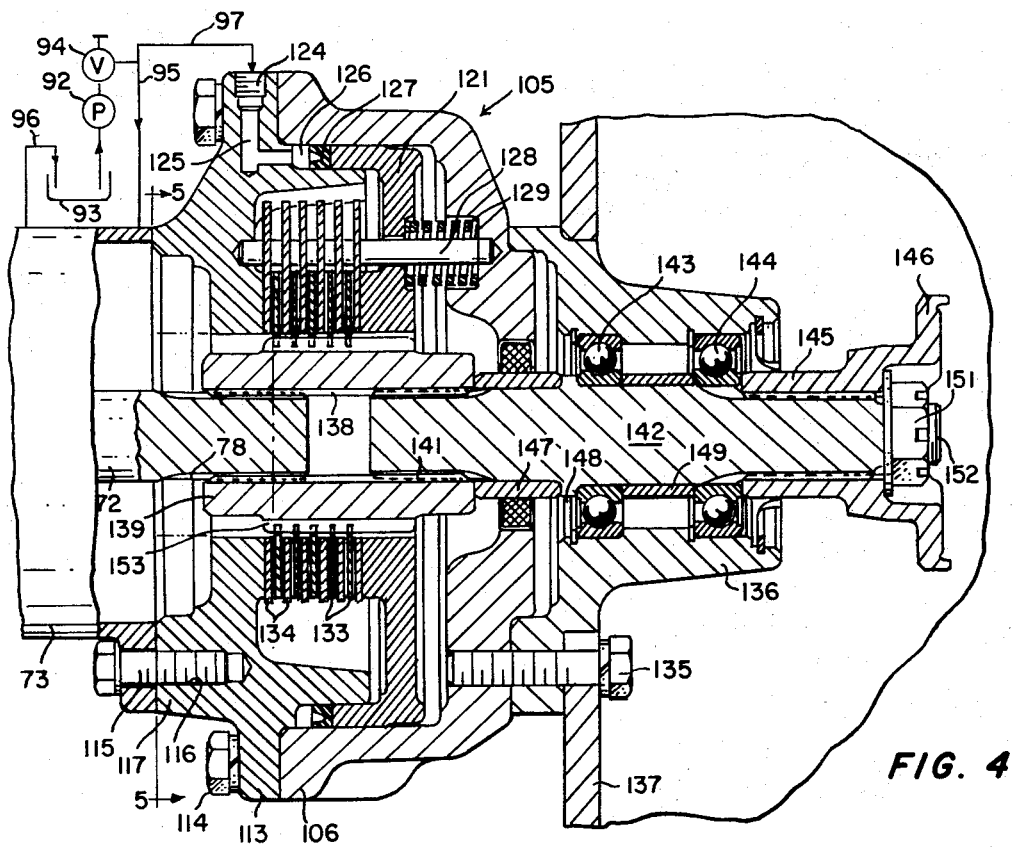
FIG. 4 is a fragmentary sectional view showing a further embodiment.

Referring to FIG. 4 which illustrates a further embodiment of the invention, the auxiliary housing is essentially the same as in FIG. 3, except that it is rigidly secured at its inner end as by bolts 135 to a shaft support boss 136 rigid with a mechanism housing 137. In this embodiment the splined end 78 of the motor shaft is nonrotatably connected with the internally splined bore 138 of a hollow coupling shaft 139, and the splined inner end 141 of a coaxial shaft 142 is also nonrotatably connected within bore 138. Shaft 142 is rotatably mounted in boss 136 by roller bearing assemblies 143 and 144, and its splined outer end 145 carries a shaft coupling 146.

An axially rigid spacer collar 147 extends between the inner end of shaft 139 and one side of a shoulder 148 on shaft 142. The inner race of bearing 143 extends between the other side of shoulder 148 and another rigid spacer collar 149 that abuts the inner race of bearing 144. Coupling 146 abuts the outer end of the inner race of bearing 144 so that when the fastener nut assembly 151 on the threaded end 152 of shaft 142 is tightened the bearings are loaded.

The outer periphery of shaft 139 is longitudinally splined at 153 to slidably receive the serrated inner peripheries of discs 133, and the cooperating set of discs 134 is longitudinally slidably on pins 128 as in FIG. 3.

Figure 5:
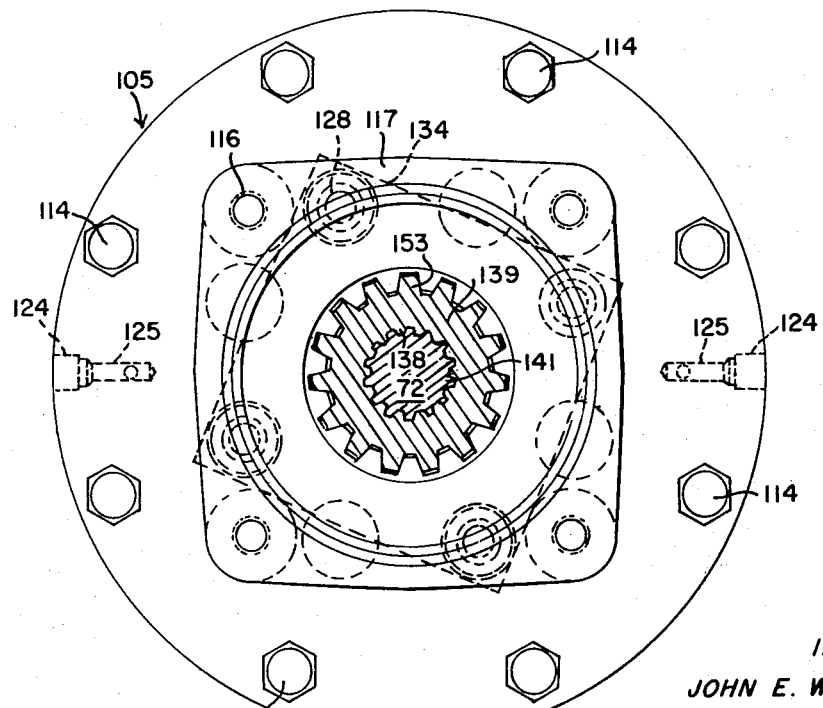
FIG. 5 is an end view of the embodiment of FIG. 4.

As shown in FIG. 5, the discs 134 may be rectangular, although any suitable configuration is within the scope of the invention. Discs 133 may be similarly shaped. Discs 81 and 83 of FIG. 1 may also be rectangular.

In operation, as in the other embodiments, the presence of fluid under pressure in chamber 126 displaces plunger 121 to brake disengaged condition, and when there is a reduction in pressure in chamber 126 the expanding springs quickly clamp the friction discs together to arrest rotation of shaft 139 and the shaft 142 connected to it.

The discs 81, 83, 133 and 134 may be plates having any desired peripheral configuration, and the term "brake discs" as used herein in the specification and claims embraces such plates that may be of rectangular, circular or any other external configuration and which may have added friction material on one or both surfaces.

The capacity of the brake may be varied by using different numbers of discs 81 (133) and 83 (134). FIG. 6 shows coupling shaft 103 as nonrotatably connected to four inner discs 133 instead of five as shown in FIG. 3. A flat-sided spacer ring 154 is secured upon the inner flat surface 155 of housing portion 113 as by a series of countersunk head screws 156 entering threaded holes in surface 155. FIG. 7 shows coupling shaft 103 as nonrotatably mounting only three inner discs 133. In FIG. 7 the spacer 157 is correspondingly thicker than spacer 154. In FIGS. 6 and 7 five and four outer discs 134 respectively are used.

The spacers are of such thickness that, regardless of how many discs are used, the other parts are exactly the same as in FIG. 3 and the plunger stroke will be exactly the same in all cases. The same use of spacers such as 154 and 157 could be used in all embodiments herein illustrated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Drive control means adapted to be disposed between a drive motor assembly on the one hand and a driven assembly on the other hand comprising relatively stationary support means, coupling shaft means rotatably mounted on said support means provided at one end for operative connection to the drive motor assembly and at the other end to the input of said driven assembly, brake means on said support means having cooperating engageable members on the support means and shaft means respectively, and means for selectively actuating said brake means comprising a plunger slidable in said support means, there being a fluid pressure chamber on one side of said plunger and resilient biasing means at the other side of said plunger, and means for introducing fluid under pressure into said chamber for displacing said plunger in the direction for releasing said brake means while compressing said resilient biasing means, said biasing means being effective to displace said plunger to cause braking engagement of said members upon reduction of fluid pressure in said chamber.

2. The drive control means defined in claim 1, wherein said support means is a housing enclosing said shaft means and said brake means and open at opposite ends for access to said ends of said shaft means.

3. The drive control means defined in claim 2, wherein said housing comprises two axially secured end members internally defining said chamber and slidably mounting said plunger.

4. The drive control means defined in claim 2, wherein said coupling shaft means consists of a coupling shaft having an internally splined bore at one end and an externally splined section at the other end.

5. The drive control means defined in claim 2, wherein said shaft means consists of a coupling shaft having internally splined bores at opposite ends.

6. The drive control means defined in claim 1, wherein said brake means comprises alternate elements axially slidably and nonrotatably mounted on said support means and shaft means respectively, and said plunger is resiliently biased axially of said elements.

7. In a drive reduction gearing assembly having an input adapted to be driven from a motor and an output adapted to be connected to a device to be operated, a coupling shaft having its inner end drive connected to said input, a positive brake operatively connected directly to said input, said brake being a disc brake comprising a series of brake elements nonrotatably mounted on said shaft and a coacting relatively nonrotatable series of brake elements, and operator controlled actuator means for selectively and rapidly engaging and disengaging said brake comprising a reciprocable plunger, spring means for displacing said plunger to operatively engage said brake elements for arresting shaft rotation and hydraulic means for oppositely displacing said plunger to operatively disengage said brake elements and compress said spring means.

8. In the drive reduction gearing assembly defined in claim 7, a main housing enclosing said reduction gearing, an auxiliary housing attached to said main housing at said input and said coupling shaft being rotatably mounted is said auxiliary housing.

9. In the drive reduction gearing assembly defined in claim 8, a drive motor mounted on said auxiliary housing and having a shaft nonrotatably connected to the outer end of said coupling shaft.

10. In the drive reduction gearing assembly defined in claim 9, said reduction gearing comprising a gear at said input having a bore and said coupling shaft having its inner end extending within said bore and nonrotatably connected to said gear.

11. In the drive reduction gearing assembly defined in claim 9, said coupling shaft being hollow with a central bore, and said input comprising a shaft projecting into said coupling shaft bore and nonrotatably connected to said coupling shaft.

12. A drive control assembly comprising a housing having opposite end members axially secured together, one of said end members having an inwardly extending rib projecting within the other member to define a fluid pressure chamber, a plunger slidably mounted in said chamber, resilient means biasing said plunger in one direction, shaft means rotatably mounted in said housing, and brake means disposed between the housing and said shaft means operably associated with said plunger so that when said plunger is displaced by fluid pressure in said chamber said resilient means is energized and said brake means is rendered inactive with respect to said shaft means.